United States Patent
Ikeda et al.

(10) Patent No.: US 6,315,203 B1
(45) Date of Patent: Nov. 13, 2001

(54) AUTOFOCUS BAR CODE READER

(75) Inventors: Kenichi Ikeda; Kazuo Ishii, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/139,712

(22) Filed: Aug. 25, 1998

(30) Foreign Application Priority Data

Aug. 25, 1997 (JP) .................................................. 9-228455

(51) Int. Cl.[7] ........................................................ G06K 7/10
(52) U.S. Cl. .............................. 235/462.23; 235/462.33
(58) Field of Search .................... 235/462.22, 462.23, 235/462.24, 462.33, 462.01; 359/205

(56) References Cited

U.S. PATENT DOCUMENTS

| | | | |
|---|---|---|---|
| 5,436,439 | 7/1995 | Nishimura et al. | 235/462 |
| 5,510,605 | 4/1996 | Miyazaki | 235/467 |
| 5,877,883 | * 3/1999 | Inoue et al. | 359/196 |
| 5,900,615 | * 5/1999 | Katoh et al. | 235/462.43 |

FOREIGN PATENT DOCUMENTS

| | | |
|---|---|---|
| 02075489 | 3/1990 | (JP) . |
| 02133891 | 5/1991 | (JP) . |
| 04167990 | 6/1992 | (JP) . |
| 5-46796 | 2/1993 | (JP) . |
| 8-129600 | 5/1996 | (JP) . |

* cited by examiner

*Primary Examiner*—Donald Hajec
*Assistant Examiner*—Mark Tremblay
(74) *Attorney, Agent, or Firm*—Foley & Lardner

(57) ABSTRACT

A bar code reader includes a semiconductor laser diode as a source of an elliptical shape divergent laser beam and a shaping section for shaping the elliptical shape divergent laser beam to provide a shaped laser beam in the form of a circular shape collimating laser beam. A distance measuring section measures a distance to a bar code label and generates a distance information signal. A temperature sensor is attached to a casing of the shaping section. The temperature sensor detects the ambient temperature and generates a temperature information signal. A focal position controlling section conducts a focal position control in response to the distance information signal and the temperature information signal so that the shaped laser beam will have its focal position on the bar code label. A scanning section lights the bar code label with the shaped laser beam that has been subjected to the focal position control. A light intercepting section intercepts reflected light by the bar code label and generates an output indicative of the intercepted reflected light. A decoding section decodes the output. An outputting section outputs the decoded result to an external device. The shaping section includes a collimating lens, a first cylindrical lens and a second cylindrical lens, all of which have a short focal distance.

6 Claims, 3 Drawing Sheets

AUTOFOCUS BAR CODE READER

FIELD OF THE INVENTION

The present invention relates to a bar code reader, and more particularly to an autofocus bar code reader.

BACKGROUND OF THE INVENTION

Referring to FIGS. 3 and 4, a less preferred embodiment of an autofocus bar code reader, generally designated by the reference numeral 30, is explained. A conveyer 31 transports an article 32 having attached thereto a bar code label 33. A distance measuring section 9 measures distance 34 to the bar code label 33 and generates a distance information pulse signal 17 indicative of the measured distance. The distance information pulse signal 17 is fed to a is focal position controlling section 8. A laser beam generating section 35 generates circular shape laser beam 16. In response to the distance information pulse signal 17, the focal position controlling section 8 conducts a focal position control so that the circular shape laser beam 16 will have its focal position on the bar code label 33. The circular shape laser beam that has been subjected to the focal position control is used as a scan laser beam 18 upon lighting the bar code label 33. Reflected light 19 by the bar code label 33 is intercepted and then decoded to obtain information on the bar code label 33. The distance measuring section 9 determines the distance 34 to the bar code label 33 by calculation after inputting result of detection of height of the article 32 by a multi-optical-axis sensor. The multi-optical-axis sensor includes a light emitter 36 and a light interceptor 37 between which a number of parallel optical beams extend. The light interceptor 37 detects the optical beams, in number, which are interrupted by the article 32 and provides the output indicative of the detected result to the distance measuring section 9.

In the bar code reader of the above kind, the diameter of the scan laser beam 18 is determined in accordance with the width of the narrowest bar of the bar code label 33. If the laser beam diameter is too large as compared to the width of the narrowest bar, a reduction in resolution occurs, making it impossible to detect the width of each bar with good accuracy, causing a drop in read performance. If the laser beam diameter is too small as compared to the width of the the narrowest bar, there is the tendency to detect fine defects and/or small dirty spots on a bar code label, causing a drop in read performance. It is therefore generally known to adjust the diameter of the scan laser beam upon being intercepted by a bar code label on its face as large as the width of the narrowest bar of the bar code label. Read operation under this condition may be called read operation with the optimized beam diameter. As shown in FIG. 2, the diameter 40 of a laser beam 41 is the smallest at its focal position 42. Therefore, it is the common practice to adjust the beam diameter equal to the above-mentioned optimized beam diameter at the focal position 42 that lies on the face of a bar code label to be read.

The preceding description explains why the distance to a bar code label is measured in laying the focus of laser beam on the face of the bar code label upon reading the bar code label in the case where the distance is subject to variations.

In order to maintain high read performance of a bar code reader, it is demanded to eliminate or at least reduce deviation from the optimized beam diameter.

Referring to FIG. 4, the laser beam generating section 35 is further described to clarify what causes the deviation from the optimized beam diameter. The laser beam generating section 35 includes a semiconductor laser diode 1, a collimating lens 2, a cylindrical lens a 3, and a cylindrical lens b 4, and generates a shaped laser means in the form of a circular shape laser beam 16. It has been found that variation in the ambient temperature of the laser beam generating section 35 causes variation in the focal position of the circular shape laser beam 16, thus inducing occurrence of the above-mentioned deviation. As is readily seen from FIG. 2, any deviation from the focal position 42 causes the laser beam diameter 40 to increase, causing a drop in read performance.

This phenomenon is observed in a bar code reader that employs a semiconductor laser diode as a source of laser beam when the ambient temperature is subjected to variation. As shown in FIG. 4, the semiconductor laser diode 1 generates an elliptical shape divergent laser beam 14 having different angles of divergence 50 in different directions. The maximum value of the angles of divergence 50 is around 60 degrees. The collimating lens 2 converts the elliptical shape divergent laser beam 14 to a collimating laser beam 15.

Distance a between the semiconductor laser diode 1 and the collimating lens 2 may be increased by using, as the collimating lens 2, a lens with increased aperture. The use of such lens result in an increase in accommodation space for the collimating lens 2 and an increase in manufacturing cost. The semiconductor laser diode 1 generates the elliptical divergent laser beam at a low output level. Thus, it is necessary to collect the entire laser beam within the angles of divergent 50 to provide the shaped laser beam at a sufficiently high output. This is the reason why the lens with a large aperture is required to collect all of the beams emitted by the semiconductor laser diode 1. The collimating laser beam 15 still has an elliptical cross sectional profile. Thus, two cylindrical lenses 3 and 4 are provided to convert the collimating laser beam 15 to the circular shape laser beam 16 with a circular cross sectional profile. The two cylindrical lenses 3 and 4 have a short focal distance. Two cylindrical lenses with a long focal distance may be used. In this case, an increase in accommodation space for the cylindrical lenses 3 and 4 and an increase in manufacturing cost result.

The semiconductor laser diode 1 and the lenses 2, 3 and 4 are mounted to and assembled with a casing made of aluminum. An increase in the ambient temperature causes thermal expansion of the casing. This expansion causes a change in distance between the semiconductor laser diode 1 and the collimating lens 2, a change in distance between the collimating lens 2 and the cylindrical lens a 3, and a change in distance between the cylindrical lens a 3 and the cylindrical lens b 4. In the case where the lenses with a short focal distance are used, these changes cause a substantial deviation of the focal distance of the circular shape laser beam 16 from the distance to the bar code label.

This phenomenon may be explained by the fact that, in a formula for a single lens with a focal distance f, $(1/a)+(1/b)=1/f$, a small change in the variable a causes a great change in the variable b. In FIG. 4, the collimating lens 2 collimates the elliptical shape divergent laser beam 14. This may be expressed by the formula after substituting the variable a with the distance a and the variable b with infinite. The collimating laser beam has its focal position spaced by infinite distance. Thus, the variable b in the formula is infinite. In this case, the term $1/b$ in the formula is zero to give the relation that $a=f$.

FIG. 5 shows the results of calculation of the variables f, a and b. As readily seen from FIG. 5, the shorter the focal distance f is, the higher is the rate of reduction in the variable b with respect to an increase in the variable a. In other words, with the same increase in the variable a, the rate at which collimating light converges increases as the focal distance f of a lens decreases. This means that the laser beam 15, which is to be collimated, tends to converge in response to an increase in the distance between the semiconductor laser diode 1 and the collimating lens 2. Further, the shorter the focal distance of the collimating lens 2 is, the higher is the rate at which the focal position of the collimating laser beam 15 changes in response to a change in the distance between the semiconductor laser diode 1 and the collimating lens 2. It is the practice to adjust the focal distance of the circular shape laser beam 16 to a designed distance based on the assumption that the laser beam 15 is a collimating light. Thus, if the laser beam 15 converges, the focal distance of the circular shape laser beam 16 varies.

The use of the semiconductor laser diode 1 as the source of is intended to accomplish minituarization and cost reduction of the bar code reader. Thus, it would be required to use lenses with a short focal distance in shaping the laser beam. As mentioned before, the use of the lenses with a short focal distance poses the problem that a small change in the distance a due to thermal expansion causes a substantial change in the focal position of the circular shape laser beam 16. This change in the focal position of the circular shape laser beam 16 causes a change in the foil position of the scan laser beam 18. Thus, the autofocus bar code reader shown in FIG. 3 has potential problem that, when used in the environment of varying temperatures, it would be difficult to keep the focal position of the scan laser beam 18 on the bar code label 33 with good accuracy.

In the preceding description, attention has been paid to a change in the distance between the semiconductor laser diode 1 and the collimating lens 2 as the cause of occurrence of substantial change in the focal position of the scan laser beam 18. Similarly, a change in distance between the collimating lens 2 and the cylindrical lens a 3, and a change in distance between the cylindrical lens a 3 and the cylindrical lens b 4 causes a change in the focal position of the circular shape laser beam 16. However, this change in the focal position of the circular shape laser beam 16 is small and negligible. The focal position controlling section employs lenses. But, these lenses have a long foal distance so that a change between the adjacent two lenses has little influence on a change in focal distance.

If, as the source of laser beam, a laser tube is used, the collimating lens and the cylindrical lenses are no longer required. In this case, there is no potential problem of the above-mentioned kind due to the thermal expansion.

An object of the present invention is to improve the bar code reader of the above kind such that the influence of temperature on performance of the device is eliminated to allow the use of a semiconductor laser diode as a source of laser beam.

SUMMARY OF THE INVENTION

According to one aspect of the present invention, there is provided a method of controlling the focal position of a shaped laser beam employed by a bar code reader, comprising the steps of:

generating a shaped laser beam;

measuring a distance to a bar code label and generating a distance information signal indicative of the measured distance;

deriving temperature information from a portion where the shaped laser beam is generated and generating a temperature information signal indicative of the derived temperature information;

conducting a focal position control in response to the distance information signal and the temperature information signal so that the shaped laser beam will have its focal position on the bar code label; and lighting the bar code label with the shaped laser beam that has been subjected to the focal position control.

According to another aspect of the present invention, there is provided a bar code reader comprising:

a laser beam generating section for generating a shaped laser beam;

a distance measuring section for measuring a distance to a bar code label and generating a distance information signal indicative of the measured distance;

a temperature sensor for deriving temperature information from the laser beam generating section and generating a temperature information signal indicative of the derived temperature information;

a focal position controlling section for conducting a focal position control in response to the distance information signal and the temperature information signal so that the shaped laser beam will have its focal position on the bar code label;

a scanning section for lighting the bar code label with the shaped laser beam that has been subjected to the focal position control;

a light intercepting section for intercepting reflected light by the bar code label and providing an output indicative of the intercepted reflected light;

a decoding section for decoding the output of the light intercepting section; and an outputting section for outputting the decoded result.

DESCRIPTION OF THE PREFERRED EMBODIMENTS

Figure 1A:
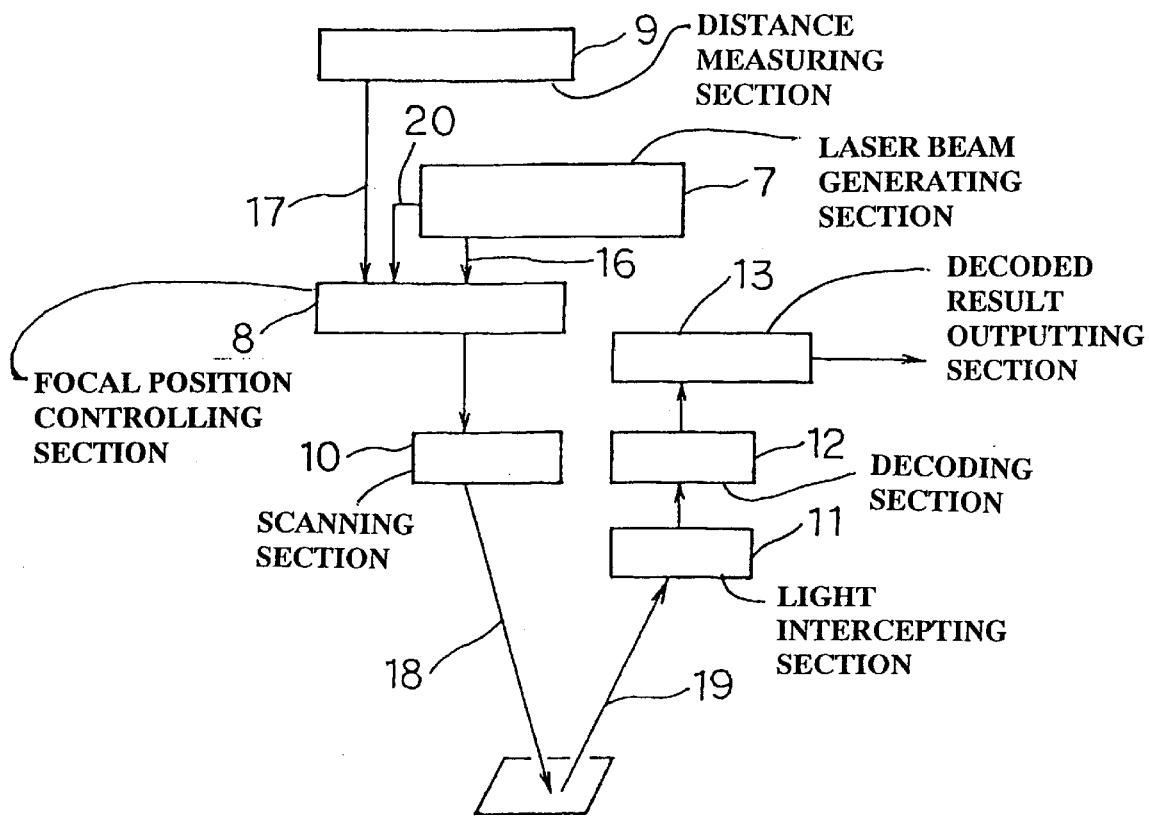
FIG. 1(a) is a block diagram illustrating an embodiment of a bar code reader according to the present invention.
Figure 1B:
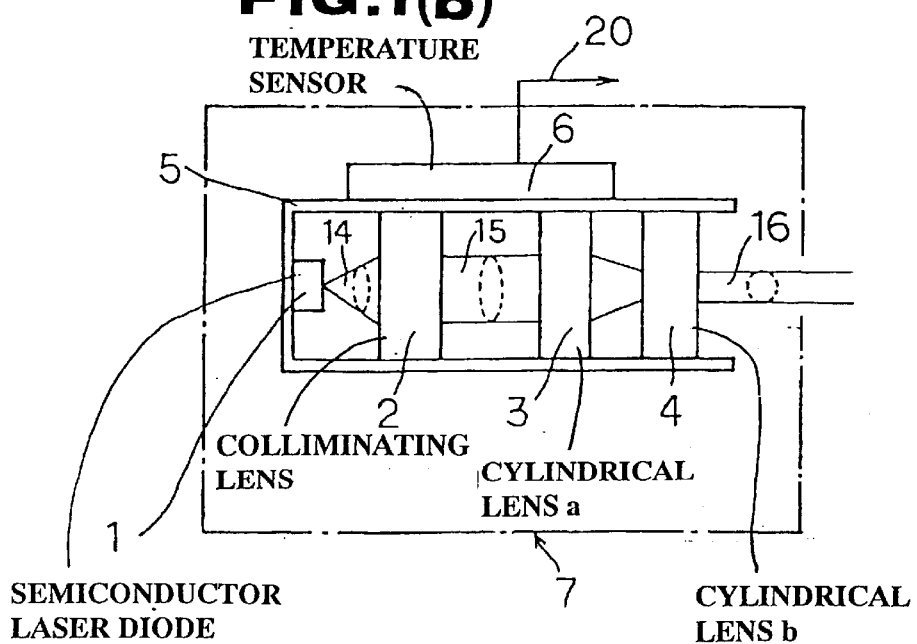
FIG. 1(b) is a schematic view of a laser beam generating section of the bar code reader.
Figure 2:
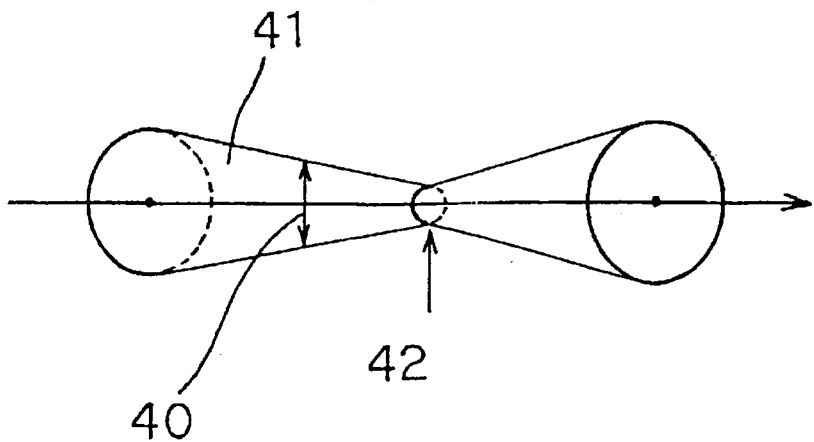
FIG. 2 is a schematic view illustrating focus of a laser beam.
Figure 3:
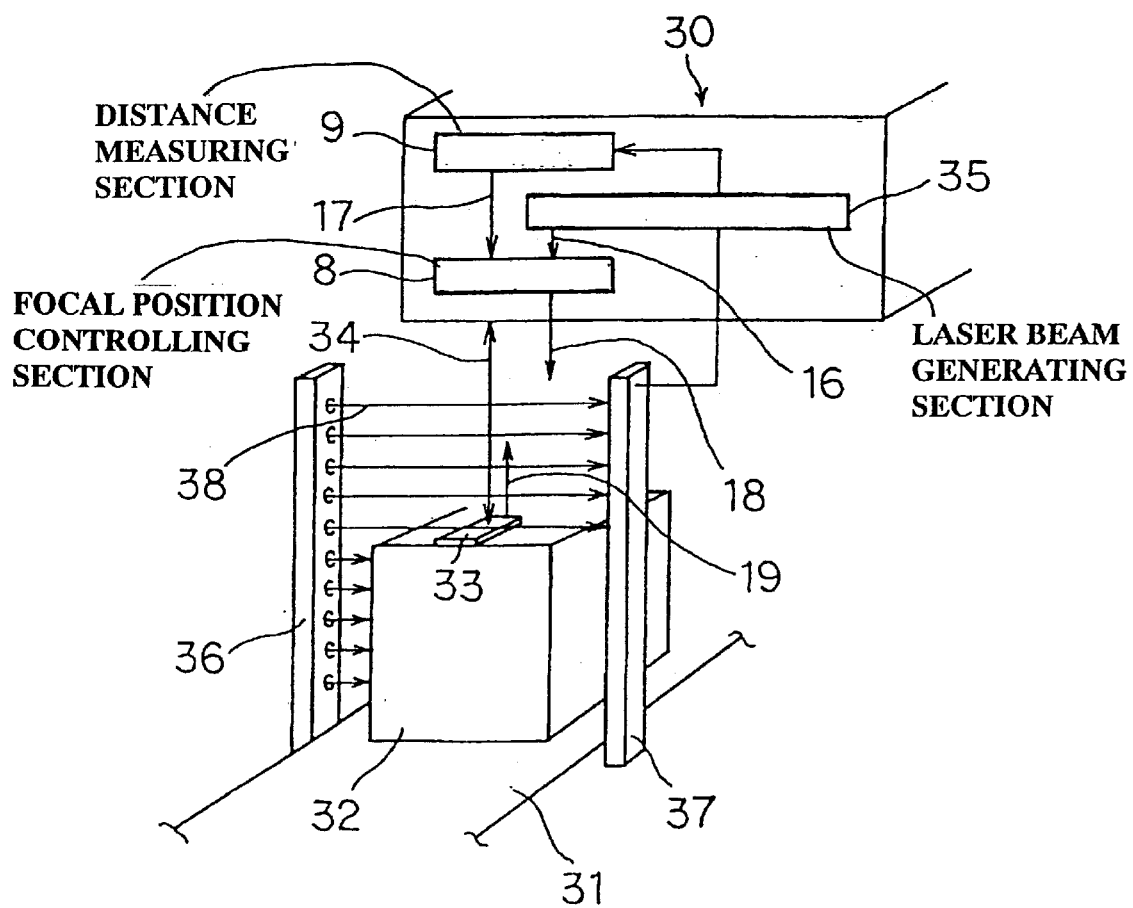
FIG. 3 is a schematic view of the installation of a less preferred embodiment of bar code reader.
Figures 4, 5:
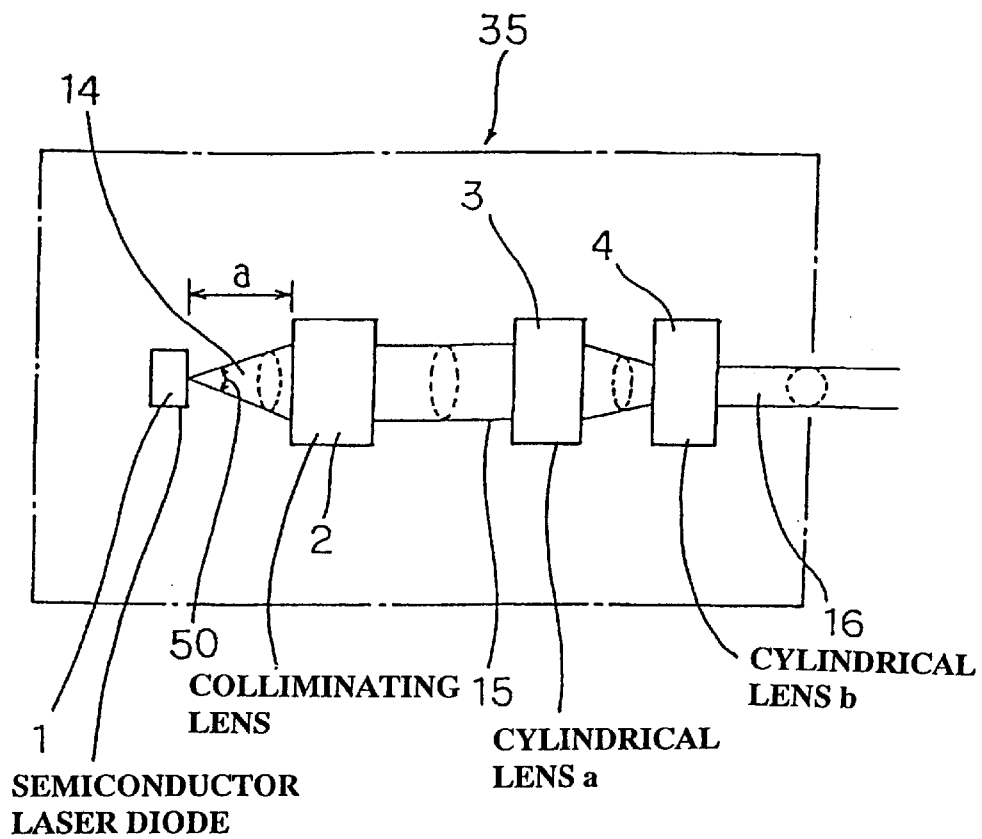
FIG. 4 is a schematic view of a laser beam generating section of the bar code reader shown in FIG. 3.
FIG. 5 is a table of results of calculation of the variables f, a and b.

Referring to FIGS. 1(a) and 1(b), the embodiment according to the present invention is described.

The bar code reader comprises a laser beam generating (LBG) section 7. As shown in FIG. 1(b), the LBG section 7 includes a semiconductor laser diode 1 as a laser beam source, a laser beam contour shaping (LBCS) unit, a casing 5, and a temperature sensor 6 arranged to detect temperature of the casing 5. The LBCS unit includes a collimating lens 2, a cylindrical lens a 3, and a cylindrical lens b 4.

As shown in FIG. 1(a), the bar code reader also comprises a focal position controlling (FPC) section 8, a distance measuring (DM) section 9, a scanning section 10, a light intercepting (LI) section 11, a decoding section 12, and a decoded result outputting (DRO) section 13.

Referring again to FIG. 1(b), the semiconductor laser diode 1 generates an elliptical shape divergent laser beam 14. The collimating lens 2 converts the divergent laser beam 14 to a collimated laser beam 15. The cylindrical lens 3 and 4 cooperate with each other to convert the collimated laser beam 15 to a shaped laser beam in the form of a circular shape laser beam 16. The circular shape laser beam 16 is fed to the FPC section 8. The distance measuring section 9 determines the position of the bar code label by measuring or detecting a distance to the bar code label, and generates a distance information pulse signal 17. The distance information pulse signal 17 is fed to the FPC section 8.

The FPC section 8 employs the same focal position controlling system as that described in JP-A 5-46796, which was laid-open on Feb. 26, 1993. According to this system, a group of lenses mounted within the FPC section 8 can take different positions. Specifically, external pulses applied to the FPC section 8 cause a motor, such as a stepping motor, to move the position of the group of lenses for adjustment of the focal position of the circular shape laser beam 16. In this embodiment, the external pulses are in the form of the distance information pulse signal 17.

Suppose now that one pulse causes a displacement of 10 mm of the focal position of a scan laser beam 18 from the FPC section 8. Assuming that the distance to the bar code label is 1000 mm, the distance information pulse signal 17 will contain 100 pulses because 1000 mm/10 mm=100 pulses. In response to this pulse signal 17 containing 100 pulses, the FPC section 8 conducts a focal position control so that the scan laser beam 18 will have its focal position at a position 1000 mm distant from the FPC section 8. However, the focal distance of the circular shape laser beam 16 must stay within a predetermined range to hold the relation that if 100 pulses, then the focal position of the scan laser beam 18 is 1000 mm distant. Thus, if the focal distance falls outside of the predetermined range owing to some reason, it is no longer possible to keep the above-mentioned relation. As mentioned before, a change in environment temperature of the LBG section 7 causes a change in the focal position of the circular shape laser beam 16, causing a change in the focal position of the scan laser beam 18. The change in the focal position of the circular shape laser beam 16 is caused by a change in distance between the semiconductor laser diode 1 and the collimating lens 2 owing to thermal expansion taking place in the LBG section 7. Apparently, this change in distance is determined by thermal expansion coefficient and temperature of the material which the casing 5, see FIG. 1(b), is made of. Let us consider the case where the material of the casing 5 is aluminum. Thermal expansion coefficient of aluminum is $23 \times 10^{-6}$. The distance between the semiconductor laser diode 1 and the collimating lens 2 is 10 mm at normal temperature of 25 degrees C. Let the change in temperature be 10 degrees C, the change in distance can be expressed as:

[Change in Distance]=$(23 \times 10^{-6}) \times 10$ mm$\times 10°$ C.=2.3 $\mu$m.

From the above equation, it is understood that the ambient temperature determines a change in the distance because the thermal expansion coefficient of the material, which the casing 5 is made of, is unaltered. The distance between the semiconductor laser diode 1 and the collimating lens 2 determines the focal distance of the circular shape laser beam 16, so that a change in ambient temperature determines a change in the focal distance of the circular shape laser beam 16. Thus, a change in ambient temperature determines a change in the focal distance of the scan laser beam 18.

For the previous reason, a change in the focal distance of the scan laser beam 18 against a change in ambient temperature may be given by calculation. Assume now, as an example, that an increase of 1 (one) degree C in temperature of the casing 5 causes a reduction of $\alpha$ mm in the focal position of the scan laser beam 18. Further, it is assumed that the bar code reader is installed and adjusted such that, when the casing 5 is at normal temperature of 25 degrees C, the focal distance of the scan laser beam 18 is as far as the distance to the bar code label. Let us now consider the case where the casing temperature has increased by 10 degrees C to 35 degrees C from 25 degrees C, causing the focal position of the scan laser beam is to decrease by $10\alpha$ mm. Since it has been assumed that the distance to the bar code label is 1000 mm, the distance information pulse signal 17 that is generated by the DM section 9 contains 100 pulses (=1000 mm/10 mm). In response to the increase in temperature of 10 degrees C, the temperature sensor 6 of the LBG section 7 generates a temperature information pulse signal 20. This pulse signal 20 is fed to the FPC section 8 for compensation of the focal distance reduction of $10\alpha$ mm. Since it is assumed that the FPC section 8 increases the focal distance by 10 mm per 1 (one) pulse, the number of pulses of the temperature information pulse signal 20 is given by $10\alpha$ mm/10 mm=$\alpha$. Thus, in this case, $\alpha$ pulses are fed, as the temperature information pulse signal 20, to the FPC section 8. The FPC section 8 is operable in response to the total of the pulses given as the distance information signal 17 and as the temperature information signal 20. Thus, the FPC section 8 can compensate for the reduction of $10\alpha$ mm owing to the temperature rise of 10 degrees C and conduct the focal position control so that the scan laser beam 18 will have its focal position at a location 1000 mm distant.

Referring back to FIG. 1(a), a scanning section 10 lights the bar code label with the scan laser beam 18, which is the circular shape laser beam 16 that has been subjected to the focal position control conducted by the FPC section 8. A light intercepting section 11 intercepts reflected light 19 by the bar code label and converts an optical signal to an electric signal. A decoding section 12 decodes the intercepted reflected light A decoded result outputting section 13 outputs the decoded result to an external device.

What is claimed is:

1. A method of controlling the focal position of a shaped laser beam employed by a bar code reader, comprising the steps of:

generating a shaped laser beam;

measuring a distance to a bar code label and generating a distance information signal indicative of the measured distance;

deriving temperature information from a position where the shaped laser beam is generated and generating a temperature information signal indicative of the derived temperature information;

conducting a focal position control in response to the distance information signal and the temperature information signal so that the shaped laser beam will have its focal position on the bar code label; and lighting the bar code label with the shaped laser beam that has been subjected to the focal position control.

2. The method as claimed in claim 1, wherein the shaped laser beam generating step includes sub-steps of generating a laser beam and shaping the generated laser beam, and wherein the temperature information signal is indicative of a change in the ambient temperature of the portion where the shaped laser beam is generated.

3. A bar code reader comprising:

a laser beam generating section for generating a shaped laser beam;

a distance measuring section for measuring a distance to a bar code label and generating a distance information signal indicative of the measured distance;

a temperature sensor for deriving temperature information from the laser beam generating section and generating a temperature information signal indicative of the derived temperature information;

a focal position controlling section for conducting a focal position control in response to the distance information signal and the temperature information signal so that the shaped laser beam will have its focal position on the bar code label;

a scanning section for lighting the bar code label with the shaped laser beam that has been subjected to the focal position control;

a light intercepting section for intercepting reflected light by the bar code label and providing an output indicative of the intercepted reflected light;

a decoding section for decoding the output of the light intercepting section; and an outputting section for outputting the decoded result.

4. The bar code reader as claimed in claim 3, wherein the laser beam generating section includes a source of a laser beam and a shaping section for shaping the laser beam to provide the shaped laser beam, and wherein the temperature sensor is attached to the shaping section.

5. The bar code reader as claimed in claim 4, wherein the shaping section includes a casing, and wherein the temperature sensor is attached to the casing.

6. The bar code reader as claimed in claim 5, wherein the source is in the form of a semiconductor laser diode generating an elliptical shape divergent laser beam, and wherein the shaping section includes a collimating lens, a first cylindrical lens and a second cylindrical lens.

* * * * *